(12) United States Patent
Zhou et al.

(10) Patent No.: US 11,625,514 B2
(45) Date of Patent: Apr. 11, 2023

(54) NUMERICAL SIMULATION METHOD OF PULSED LASER PAINT REMOVAL AND USE THEREOF

(71) Applicant: Jiangsu University, Jiangsu (CN)

(72) Inventors: Jianzhong Zhou, Jiangsu (CN); Yanqiang Gou, Jiangsu (CN); Jianian Yang, Jiangsu (CN); Xiankai Meng, Jiangsu (CN); Qi Sun, Jiangsu (CN); Shu Huang, Jiangsu (CN); Qiang Fu, Jiangsu (CN)

(73) Assignee: Jiangsu University, Jiangsu (CN)

( * ) Notice: Subject to any disclaimer, the term of this patent is extended or adjusted under 35 U.S.C. 154(b) by 5 days.

(21) Appl. No.: 17/614,569

(22) PCT Filed: Jun. 18, 2021

(86) PCT No.: PCT/CN2021/100776
§ 371 (c)(1),
(2) Date: Nov. 29, 2021

(87) PCT Pub. No.: WO2022/033169
PCT Pub. Date: Feb. 17, 2022

(65) Prior Publication Data
US 2022/0318452 A1 Oct. 6, 2022

(30) Foreign Application Priority Data
Aug. 13, 2020 (CN) .......................... 202010811352.0

(51) Int. Cl.
*G06F 30/20* (2020.01)
(52) U.S. Cl.
CPC .................................. *G06F 30/20* (2020.01)

(58) Field of Classification Search
CPC ...... G06F 30/20; G06F 30/23; G06F 2111/10; B23K 2101/34; B23K 26/362; B23K 26/0622; B23K 26/40; G06T 17/00
See application file for complete search history.

(56) References Cited

U.S. PATENT DOCUMENTS 9,796,089 B2 * 10/2017 Lawrence, III ........ B25J 9/1697

FOREIGN PATENT DOCUMENTS

| CN | 104308368 | 1/2015 |
|---|---|---|
| CN | 109948288 | 6/2019 |

(Continued)

OTHER PUBLICATIONS

Mongelli et al., Laser Depaint Technology for Aerospace, Applications, May 2011, Air Force Research Laboratory, pp. 1-20 (Year: 2011).*

(Continued)

*Primary Examiner* — Boris Gorney
*Assistant Examiner* — Bernard E Cothran
(74) *Attorney, Agent, or Firm* — JCIP Global Inc.

(57) ABSTRACT

The present disclosure provides a numerical simulation method of pulsed laser paint removal and a use thereof. This method establishes a three-dimensional (3D) temperature field model by ANSYS software to perform a numerical simulation of nanosecond pulsed laser paint removal. A high-speed moving pulsed laser is loaded on a surface of the model in a form of heat flux, and a coordinate system is moved to realize loading on different paths. A special surface mesh screening method is used to realize loading on any surface, and it ensures that laser energy distribution on a material surface is in line with reality. In addition, an element birth/death technology is combined to remove an element that exceeds a threshold, so as to intuitively present the surface morphology after laser paint removal. The pres- (Continued)

ent disclosure can realize the prediction of the contour of a paint layer ablated by a pulsed laser.

10 Claims, 4 Drawing Sheets

(56) References Cited

FOREIGN PATENT DOCUMENTS

| CN | 208945379 U | * | 6/2019 | ............ B23K 26/36 |
|---|---|---|---|---|
| CN | 110276149 | | 9/2019 | |
| CN | 110991097 | | 4/2020 | |
| CN | 112149321 | | 12/2020 | |

OTHER PUBLICATIONS

Manenkov, Fundamental mechanisms of laser-induced damage in optical materials: today's state of understanding and problems, Jan. 2014, Optical Engineering, pp. 1-7 (Year: 2014).*
Gao Liaoyuan et al., "Numerical Simulation and Surface Morphology of Laser-Cleaned Aluminum Alloy Paint Layer", Chinese Journal of Lasers, May 2019, submit with English abstract, pp. 1-9.
"International Search Report (Form PCT/ISA/210) of PCT/CN2021/100776," dated Sep. 8, 2021, pp. 1-4.
"Written Opinion of the International Searching Authority (Form PCT/ISA/237) of PCT/CN2021/100776," dated Sep. 8, 2021, pp. 1-4.

* cited by examiner

NUMERICAL SIMULATION METHOD OF PULSED LASER PAINT REMOVAL AND USE THEREOF

CROSS-REFERENCE TO RELATED APPLICATION

This application is a 371 of international application of PCT application serial no. PCT/CN2021/100776, filed on Jun. 18, 2021, which claims the priority benefit of China application no. 202010811352.0, filed on Aug. 13, 2020. The entirety of each of the above mentioned patent applications is hereby incorporated by reference herein and made a part of this specification.

TECHNICAL FIELD

The present disclosure relates to the field of numerical simulation of laser ablation, in particular to a numerical simulation method of pulsed laser paint removal and a use thereof.

BACKGROUND

Maintenance and repair of mechanical products usually involve surface paint removal. Traditional paint removal methods such as chemical cleaning and physical cleaning have problems such as low cleaning efficiency, high labor intensity and secondary pollution. As a new type of surface paint removal technology, laser paint removal mainly uses high-energy laser beams to irradiate the paint layer of the material surface to make it instantaneously heated and vaporized or ablated, so as to achieve the purpose of cleaning the surface of the workpiece. Laser paint removal has received wide attention because of its advantages such as low pollution, non-contact, high cleaning quality and easy precise control. Pulsed laser cleaning has already been put into industrial applications, but it usually still requires a lot of trial and error experiments to optimize process parameters. In the laser paint removal process, it is hard to directly measure and analyze the change of the temperature caused by the absorption of laser energy by the paint layer and the substrate material, and it is hard to accurately describe the micro-scale transient effect of the pulsed laser. In this context, numerical simulation has become an effective method to solve such problems.

In recent years, the numerical simulation of laser ablation has been widely researched to control the ablation depth. For example, the Chinese patent application 201410447320.1 proposes a pulsed laser ablation depth prediction model based on the law of conservation of energy and the ablation mechanism of a nanosecond pulsed laser on a material, which can determine the relationship between the ablation depth and a process parameter. The precise control of the removal amount of the target material by nanosecond pulsed laser ablation is achieved by a calculation method. The Chinese patent application 201910566187.4 proposes a method for calculating a width of a radial heat-affected zone of a laser ablated metal target. This method obtains the surface temperature of a workpiece under the instantaneous action of a single pulsed laser and a dynamic surface temperature distribution model of the workpiece etched by a Gaussian pulsed laser. In addition, the Chinese patent application 201910255202.3 proposes a method for predicting a section contour of a nanosecond laser ablated microgroove based on a feasible domain of a process parameter, which can describe a laser focus that moves down with material removal during actual processing. The existing numerical simulations of laser ablation mainly focus on the influence of process parameters on single-pulsed laser ablation, ignoring the interaction between multi-pulsed lasers. These research methods are mostly numerical calculations, which are limited to the effect of the pulsed laser on the temperature field of the material. They can hardly break through the technical bottleneck of non-planar loading, thereby failing to visualize the morphology after laser cleaning. Therefore, there is a need for a feasible loading-based numerical simulation method to achieve global simulation of laser paint removal.

SUMMARY

In order to overcome the limitations of the prior art, the present disclosure provides a numerical simulation method of pulsed laser paint removal based on an ANS YS temperature field. The present disclosure can achieve loading on any surface as a material is removed, and accurately predict a contour of a pulsed laser ablated paint layer. The present disclosure can be effectively used for process parameter selection and processing trajectory planning in high-efficiency laser cleaning, and has important significance in promoting the practical application of laser paint removal.

A numerical simulation method of pulsed laser paint removal includes the following steps:

step 1: establishing a two-layer three-dimensional (3D) solid model of a paint layer and a substrate, and conducting meshing, where in the 3D solid model, a selected element type is an 8-node hexahedral thermal element;

step 2: setting an initial condition of a temperature field of the model to an ambient temperature, and setting a load option to transient analysis and a load mode to step load;

step 3: establishing a coordinate system with a center of a single-pulse spot on an upper surface of the paint layer as an origin, taking an axial incident direction of a laser as a z-axis, taking the origin of the coordinate system as a pulsed laser loading position, and defining the upper surface of the paint layer as a z=0 plane;

step 4: selecting nodes having a perpendicular distance not exceeding a radius of the spot from the z-axis in the 3D solid model to form a laser irradiation coverage zone, and selecting nodes with less than 8 surviving elements attached, among the nodes in the laser irradiation coverage zone, to form a laser irradiated surface;

step 5: loading the pulsed laser onto a surface of the model in a form of heat flux, the elements attached to the nodes at the laser irradiated surface being laser irradiated elements; and calculating an energy load q received by a node on an upper surface of a laser irradiated element whose center has a distance of h from the z-axis:

$$q(h, t) = \frac{12 \cdot aP}{f\tau \cdot \pi d^2} \cdot \exp\left(-\frac{12 \cdot h^2}{d^2}\right) \cdot \left(\frac{t}{\tau}\right)^7 \exp\left[7\left(1 - \frac{t}{\tau}\right)\right] \quad (1)$$

where, a is an absorption rate of laser energy by a material, P is a laser output power, f is a laser repetition frequency, d is a spot diameter, r is a laser pulse width, and t is a time, 0<t<τ;

step 6: performing iterative solution in a form of time integration according to a heat conservation law of a heat transfer theory, to calculate an instantaneous temperature of each of the nodes; and step 7: defining an instantaneous temperature of the surviving elements reaching a threshold temperature or above as a condition for an element birth/death operation, and killing a surviving element whose instantaneous temperature exceeds the threshold temperature, to obtain morphology after the removal of the paint layer by a single pulsed laser.

Further, the threshold temperature may be a vaporization temperature of a material of the paint layer.

Further, the heat conservation law of the heat transfer theory is that a temperature change of the material subjected to laser irradiation may satisfy:

$$\frac{\partial T}{\partial t} = k\left(\frac{\partial^2 T}{\partial x^2} + \frac{\partial^2 T}{\partial y^2} + \frac{\partial^2 T}{\partial z^2}\right) \quad (2)$$

where, T is a temperature, t is a time, k is a thermal diffusivity, and x, y and z obey a Cartesian coordinate system; and a boundary condition of an irradiated surface is:

$$-\lambda \cdot \partial T/\partial z = q(h,t) \quad (3)$$

where, $\lambda$ is a thermal conductivity, and another boundary condition is adiabatic surface.

Further, the iterative solution may be:

$$\{T_{n+1}\} = \{T_n\} + (1-\theta)\Delta t\{\dot{T}_n\} + \theta \Delta t\{\dot{T}_{n+1}\} \quad (4)$$

where, $\{T_n\}$ is a temperature vector at a current time, $\{T_{n+1}\}$ is a temperature vector at a next time, $\theta$ is an Euler parameter, $\Delta t$ is a time step, and $\{\dot{T}_n\}$ and $\{\dot{T}_{n+1}\}$ are change rates of the temperature vectors at the current and next times, respectively; and according to Eq. (4), a temperature change curve of the material of the paint layer at different depths in a heat conduction process is derived.

Further, according to the temperature change curve of the material of the paint layer at different depths in the heat conduction process, a time for heat transferred to the paint layer to reach a vaporization temperature at a maximum depth may be determined as a time to perform an element birth/death operation.

Further, the coordinate system may be moved by programming with ANSYS Parametric Design Language (APDL) language to control the loading position; a movement path of the origin of the coordinate system may be taken as a movement path for loading the pulsed laser; and steps 3 to 7 may be repeated for each movement, until an entire laser paint removal process is completed, to obtain simulated morphology after the removal of the paint layer by the pulsed laser loaded on a specific path.

A use of the numerical simulation method of pulsed laser paint removal is designed to determine a parameter, a processing trajectory and a scanning rate of a pulsed laser to remove a paint layer, according to surface morphology simulated by loading pulsed lasers with different parameters on different paths at different scanning rates.

Further, according to a zone of a single-pulsed laser-ablated pit in which a paint layer is effectively removed, a selection window of the scanning rate may be reduced, and an overlap rate of adjacent ablated pits may be controlled to be 0-50%.

Further, single-direction scanning may be performed track by track on a movement path for loading the pulsed laser, and adjacent scanning tracks may be arranged alternately.

Further, a scanning interval between adjacent scanning tracks may be determined based on the zone where the paint layer is effectively removed according to the simulated morphology obtained by single-track laser irradiation on a surface of the paint layer, and the overlap rate of adjacent ablated trenches may be controlled to be 0-50%.

The present disclosure has the following beneficial effects. The numerical simulation method of the present disclosure can describe a laser irradiated zone on an uneven surface as a material is removed in an actual laser paint removal process, and can realize the loading of a laser on an irregular surface. The present disclosure achieves numerical simulation of laser paint removal under multiple scanning and overlapping conditions, visually presents the surface morphology after laser paint removal, and quickly calculates the overall effect of laser paint removal. The present disclosure can formulate a process optimization plan, thereby avoiding trial and error methods commonly used in actual production, and has strong practicability.

BRIEF DESCRIPTION OF THE DRAWINGS

FIG. 2A shows an internal node with 8 surviving elements attached; and FIG. 2B shows a node with 1 to 7 surviving elements attached; and the figure only lists some possible situations, not all of them;

Figure 4:
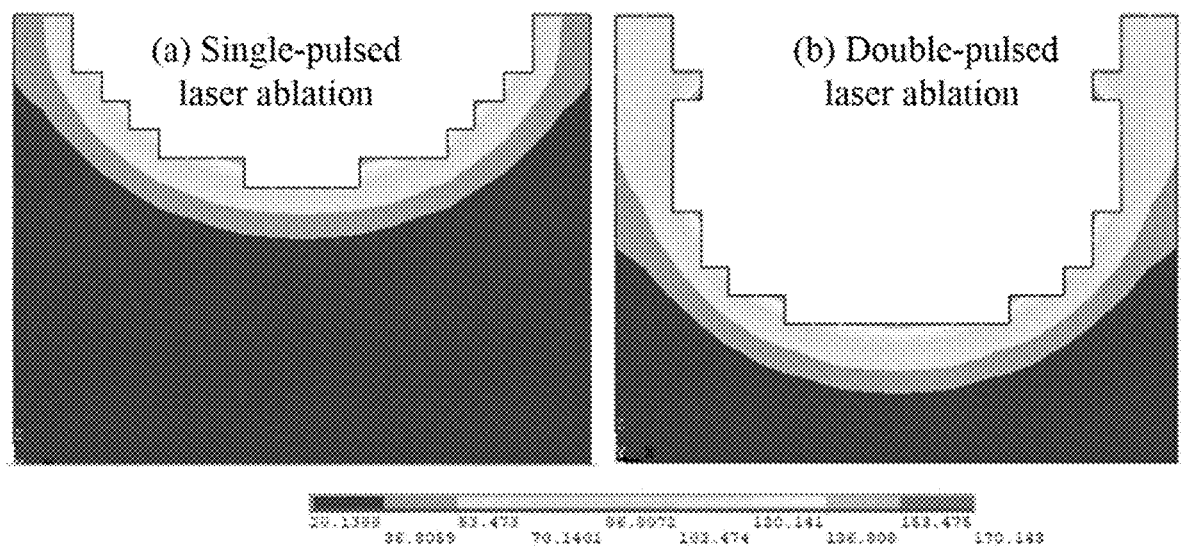
Figure 5:
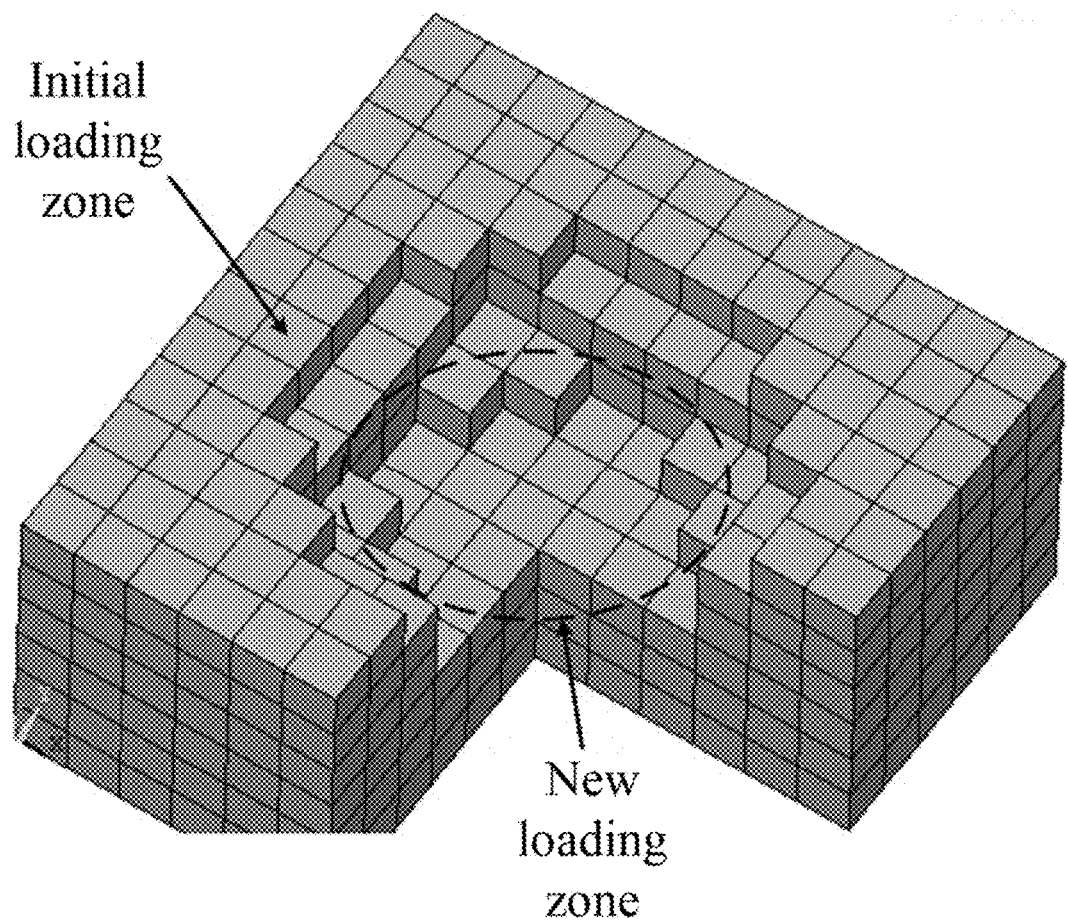
Figure 6:
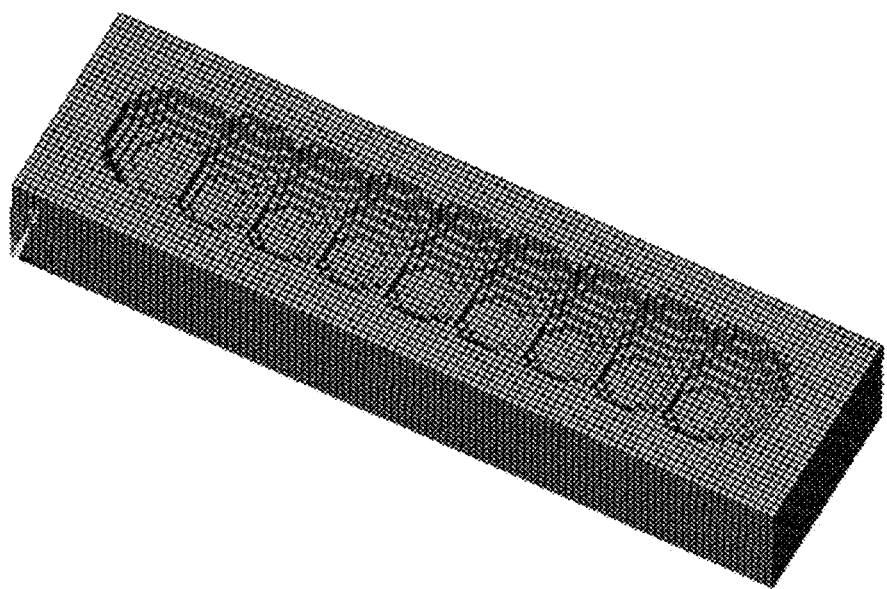
Figure 7:
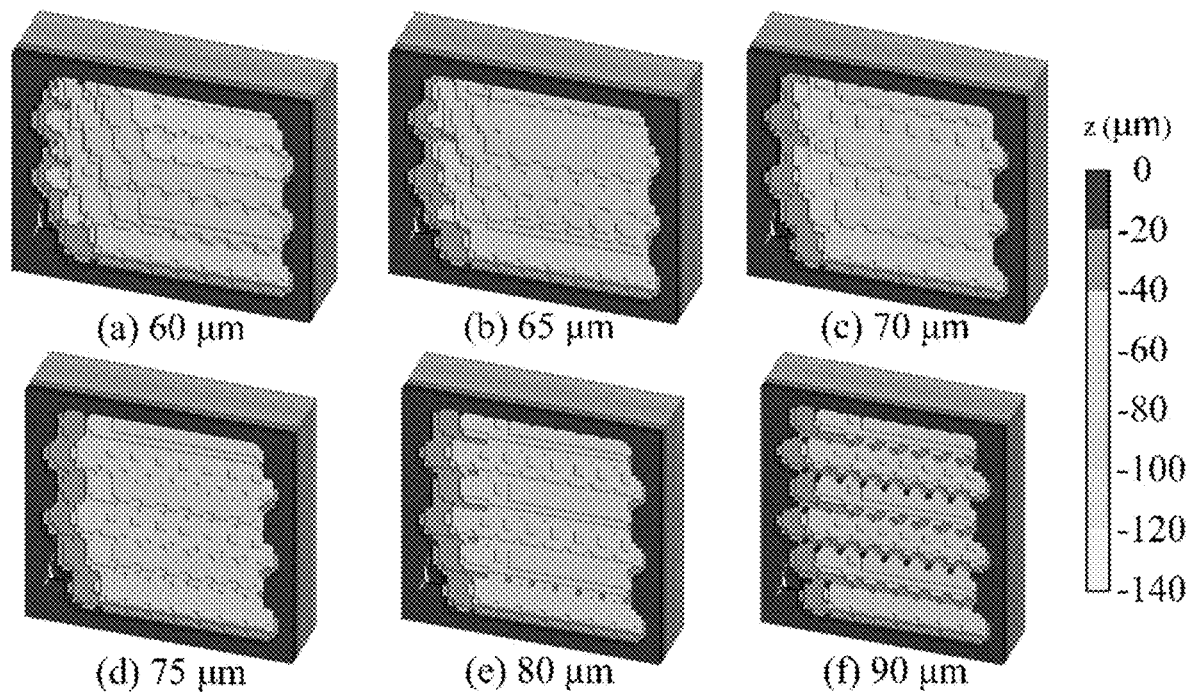

(a) and (b) of FIG. 4 respectively show a section simulated by single-point single-pulsed laser ablation and single-point double-pulsed laser ablation, where a color indicates a residual temperature;

FIG. 5 shows a loading position that goes downward as a material is removed;

FIG. 6 shows a simulation result of a single trench after laser paint removal; and FIG. 7 shows a simulation result of laser paint removal with different scanning intervals, where different colors indicate different depths.

REFERENCE NUMERALS 1. node; and 2. element.

DETAILED DESCRIPTION OF THE EMBODIMENTS

The present disclosure will be further described in detail below with reference to the drawings and examples, but the protection scope of the present disclosure is not limited thereto.

Figure 1:
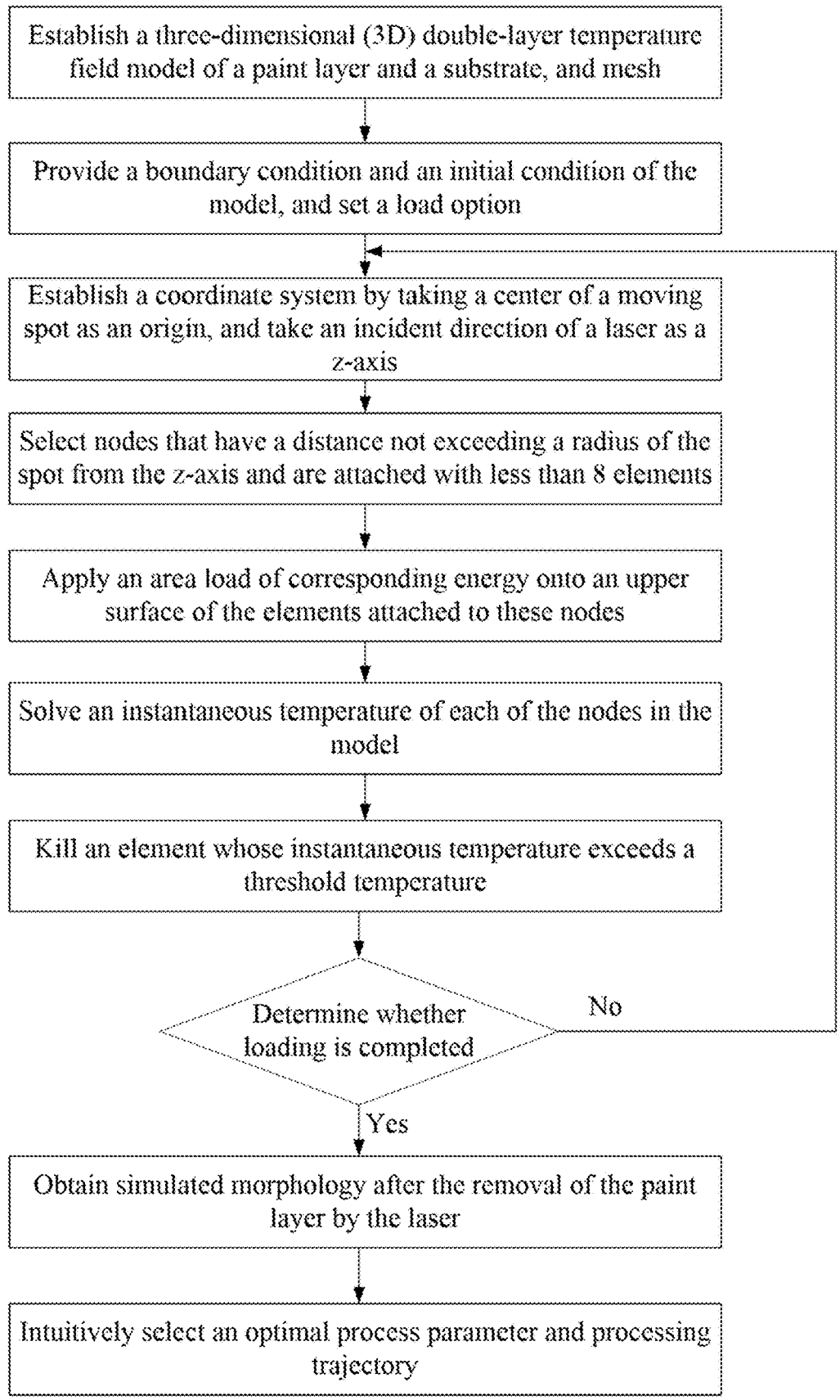
FIG. 1 is a flowchart of a numerical simulation method of pulsed laser paint removal according to the present disclosure.

The present disclosure provides a numerical simulation method of pulsed laser paint removal, which performs a numerical simulation of nanosecond pulsed laser paint removal based on an ANSYS temperature field, as shown in FIG. 1. A high-speed moving pulsed laser is loaded on a surface of a model in a form of heat flux, and a coordinate system is moved to realize loading on different paths. A special surface mesh screening method is used to realize loading on any surface in circumstances such as material removal. In addition, an element birth/death technology is combined to remove an element that exceeds a threshold, so as to predict the surface morphology after laser paint removal.

Taking nanosecond pulsed laser paint removal with a spot diameter of 50 μm and a laser energy of 100 W as an example, the simulation process of this method is described in detail below. The simulation process includes the following steps:

Step 1: A two-layer three-dimensional (3D) solid model of a paint layer and a substrate is established, where an upper layer is defined by epoxy paint, and a lower layer is defined by 304 stainless steel. In the simulation, a density is set to 1,062 and 7,750 kg/m$^3$, specific heat is set to 2,153 and 461 J·(kg·° C.)$^{-1}$, and a thermal conductivity is set to 0.3 and 16 W·(m·° C.)$^{-1}$, respectively. Meshing is conducted. In the 3D solid model, an element type is selected as an 8-node hexahedral thermal element solid 70. The element has 8 nodes, and each node has a single degree of freedom (DOF). It can realize the transfer of uniform heat flow, and can be used for 3D static or transient thermal analysis.

Step 2: An initial condition of the temperature field model is set to an ambient temperature of 20° C., and a load option is set to transient analysis, where each load step includes 20 load substeps, and a load mode is set to step load.

Step 3: A coordinate system is established with a center of a single-pulse spot on an upper surface of the paint layer as an origin, an axial incident direction of a laser is taken as a z-axis, the origin of the coordinate system is taken as a pulsed laser loading position, and the upper surface of the paint layer is defined as a z=0 plane.

Figure 2A:
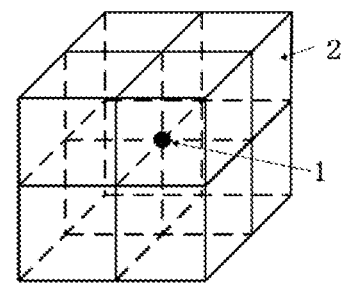
FIG. 2A and FIG. 2B show a node attached with elements, where
Figure 2B:
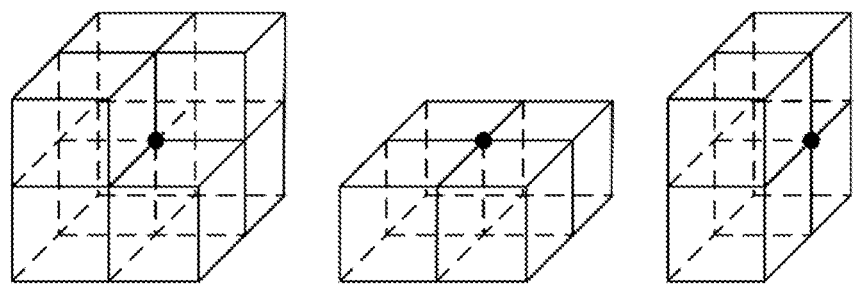

Step 4: Nodes having a perpendicular distance not exceeding a radius (25 μm) of the spot from the z-axis in the 3D solid model are selected to form a laser irradiation coverage zone, and nodes with less than 8 surviving elements attached are selected among the nodes in the laser irradiation coverage zone to form a laser irradiated surface. An internal node of the model is generally attached with 8 elements, as shown in FIG. 2A. A load located on the upper surface of the paint layer and a surface of an ablated pit is generally attached with less than 8 surviving elements, as shown in FIG. 2B. The figure only lists some possible situations, not all of them.

Step 5: The pulsed laser is loaded to a surface of the model in a form of heat flux. Elements attached to the nodes on the laser radiation energy surface are laser irradiated elements. This method realizes loading on any surface in circumstances such as material removal, and ensures that the laser energy distribution on the material surface is in line with reality. An energy load q received by a node on an upper surface of a laser irradiated element whose center has a distance of h from the z-axis is calculated:

$$q(h, t) = \frac{12 \cdot aP}{f\tau \cdot \pi d^2} \cdot \exp\left(-\frac{12 \cdot h^2}{d^2}\right) \cdot \left(\frac{t}{\tau}\right)^7 \exp\left[7\left(1 - \frac{t}{\tau}\right)\right] \quad (1)$$

where, a is an absorption rate of laser energy by a material, which is 0.3; P is a laser output power, which is 100 W; f is a laser repetition frequency, which is 100 kHz; d is a spot diameter, which is 50 μm; τ is a laser pulse width, which is 100 ns; and t is a time, 0<t<τ.

Step 6: Iterative solution is conducted on the model in a form of integration according to a heat conservation law of a heat transfer theory, to calculate an instantaneous temperature of each of the nodes.

The heat conservation law of the heat transfer theory is that a temperature change of the material subjected to laser irradiation satisfies:

$$\frac{\partial T}{\partial t} = k\left(\frac{\partial^2 T}{\partial x^2} + \frac{\partial^2 T}{\partial y^2} + \frac{\partial^2 T}{\partial z^2}\right) \quad (2)$$

where, T is a temperature, t is a time, k is a thermal diffusivity, and x, y and z obey a Cartesian coordinate system; and a boundary condition of an irradiated surface is:

$$-\lambda \partial T/\partial z = q(h, t) \quad (3)$$

where, λ is a thermal conductivity, and another boundary condition is adiabatic surface.

The iterative solution is:

$$\{T_{n+1}\} = \{T_n\} + (1-\theta)\Delta t\{\dot{T}_n\} + \theta \Delta t\{\dot{T}_{n+1}\} \quad (4)$$

where, $\{T_n\}$ is a temperature vector at a current time, $\{T_{n+1}\}$ is a temperature vector at a next time, θ is an Euler parameter, $\Delta t$ is a time step, and $\{\dot{T}_n\}$ and $\{\dot{T}_{n+1}\}$ are change rates of the temperature vectors at the current and next times, respectively; and according to Eq. (4), a temperature change curve of the material of the paint layer at different depths in a heat conduction process is derived, as shown in FIG. 3.

Step 7: An instantaneous temperature of the surviving elements reaching a threshold temperature or above is defined as a condition for an element birth/death operation, and a surviving element whose instantaneous temperature exceeds the threshold temperature is killed to obtain morphology after the removal of the paint layer by a single pulsed laser. According to the temperature change curve of the material of the paint layer at different depths in the heat conduction process, a time for heat transferred to the paint layer to reach a vaporization temperature at a maximum depth is determined as a time to perform an element birth/death operation.

Figure 3:
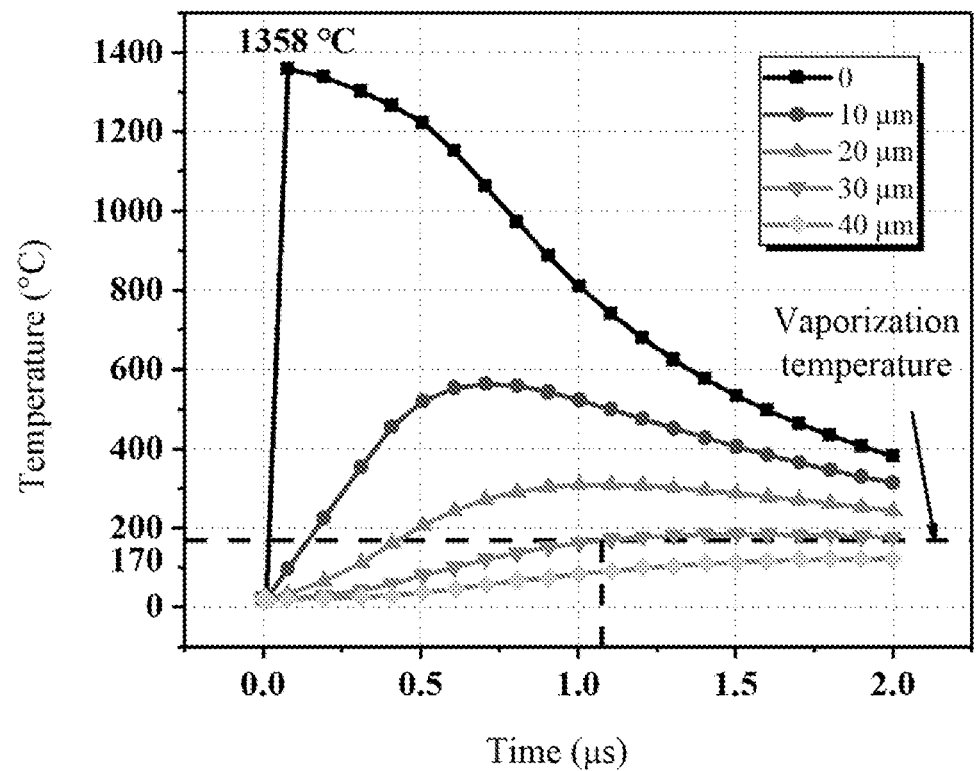
FIG. 3 shows a temperature change curve of a paint layer with time at different depths under a laser power of 100 W, where 170° C. in the figure is a vaporization temperature of the paint layer.

FIG. 3 shows a temperature change of the paint layer at different depths under single pulse ablation. A maximum depth of the paint layer to reach the vaporization temperature is about 30 μm, and the time is about 1.1 μs. Therefore, it is determined that the element birth/death operation is conducted at about 1.1 us after loading. By killing the element exceeding a boiling point of epoxy paint, that is, 170° C., the morphology after the removal of the paint layer by the single pulsed laser is obtained, as shown in (a) of FIG. 4.

Without moving the coordinate system, Steps 3 to 7 are repeated to achieve single-point double-pulsed laser ablation. The second loading is shown in FIG. 5, where the laser is loaded on a surface of a pit after material removal instead of the original paint layer. The two pulse loads are solved, and a simulated section of the paint layer ablated by single-point double-pulsed laser ablation is shown in (b) of FIG. 4.

The coordinate system is moved by programming with APDL language to control the loading position. A movement path of the origin of the coordinate system is taken as a movement path for loading the pulsed laser. Steps 3 to 7 are repeated for each movement, until an entire laser paint removal process is completed, to obtain simulated morphology after the removal of the paint layer by the pulsed laser loaded on a specific path.

The movement of the coordinate system is controlled to control the movement of the spot, such that the spot moves along a linear path at 5,000 mm/s. Steps 3 to 7 are repeated until all the loads are solved, and a simulation result of laser paint removal of a single trench is obtained. The surface morphology after paint removal is shown in FIG. 6.

The numerical simulation method of pulsed laser paint removal in the present disclosure can determine a parameter, a processing trajectory and a scanning rate of a pulsed laser to remove a paint layer, according to surface morphology simulated by loading pulsed lasers with different parameters on different paths at different scanning rates.

Single-direction scanning is conducted track by track on a movement path for loading the pulsed laser, and adjacent scanning tracks are arranged alternately. According to a zone of a single-pulsed laser-ablated pit in which a paint layer is effectively removed, a selection window of the scanning rate is reduced, and an overlap rate of adjacent ablated pits is controlled to be 0-50%. A scanning interval between adjacent scanning tracks is determined based on the zone where the paint layer is effectively removed according to the simulated morphology obtained by single-track laser irradiation on a surface of the paint layer, and the overlap rate of adjacent ablated trenches is controlled to be 0-50%. The coordinate system is controlled to move at 5,000 mm/s for constant scanning, and the multiple scanning tracks are arranged to complete area scanning simulation of laser paint removal. Different scanning intervals can be controlled. A simulation result of laser paint removal with different scanning intervals is shown in FIG. 7.

The simulation results of the surface morphology obtained by constant scanning with different scanning intervals are compared. It is intuitively found that optimal laser paint removal is achieved by single-direction scanning with a scanning interval of 70 μm.

The above examples are preferred implementations of the present disclosure, but the present disclosure is not limited to the above implementations. Any obvious improvement, substitution or modification made by those skilled in the art without departing from the essence of the present disclosure should fall within the protection scope of the present disclosure.

What is claimed is:

1. A numerical simulation method of pulsed laser paint removal, comprising the following steps:
    step 1: establishing a two-layer three-dimensional (3D) solid model of a paint layer and a substrate, and conducting meshing, wherein in the 3D solid model, a selected element type is an 8-node hexahedral thermal element;
    step 2: setting an initial condition of a temperature field of the model to an ambient temperature, and setting a load option to transient analysis and a load mode to step load;
    step 3: establishing a coordinate system with a center of a single-pulse spot on an upper surface of the paint layer as an origin, taking an axial incident direction of a laser as a z-axis, taking the origin of the coordinate system as a pulsed laser loading position, and defining the upper surface of the paint layer as a z=0 plane;
    step 4: selecting nodes having a perpendicular distance not exceeding a radius of the spot from the z-axis in the 3D solid model to form a laser irradiation coverage zone, and selecting nodes with less than 8 surviving elements attached, among the nodes in the laser irradiation coverage zone, to form a laser irradiated surface;
    step 5: loading a pulsed laser onto a surface of the model in a form of heat flux, the elements attached to the nodes at the laser irradiated surface being laser irradiated elements; and calculating an energy load q received by a node on an upper surface of a laser irradiated element whose center has a distance of h from the z-axis:

$$q(h, t) = \frac{12 \cdot aP}{f\tau \cdot \pi d^2} \cdot \exp\left(-\frac{12 \cdot h^2}{d^2}\right) \cdot \left(\frac{t}{\tau}\right)^7 \exp\left[7\left(1 - \frac{t}{\tau}\right)\right] \quad (1)$$

wherein, a is an absorption rate of laser energy by a material, P is a laser output power, f is a laser repetition frequency, d is a spot diameter, $\tau$ is a laser pulse width, and t is a time, $0<t<\tau$;
    step 6: performing iterative solution in a form of time integration according to a heat conservation law of a heat transfer theory, to calculate an instantaneous temperature of each of the nodes; and
    step 7: defining an instantaneous temperature of the surviving elements reaching a threshold temperature or above as a condition for an element birth/death operation, and killing a surviving element whose instantaneous temperature exceeds the threshold temperature, to obtain morphology after the removal of the paint layer by a single pulsed laser.

2. The numerical simulation method of pulsed laser paint removal according to claim 1, wherein the threshold temperature is a vaporization temperature of a material of the paint layer.

3. The numerical simulation method of pulsed laser paint removal according to claim 1, wherein the heat conservation law of the heat transfer theory is that a temperature change of the material subjected to laser irradiation satisfies:

$$\frac{\partial T}{\partial t} = k\left(\frac{\partial^2 T}{\partial x^2} + \frac{\partial^2 T}{\partial y^2} + \frac{\partial^2 T}{\partial z^2}\right) \quad (2)$$

wherein, T is a temperature, t is a time, k is a thermal diffusivity, and x, y and z obey a Cartesian coordinate system; and a boundary condition of an irradiated surface is:

$$-\lambda \cdot \partial T/\partial z = q(h,t) \quad (3)$$

wherein, $\lambda$ is a thermal conductivity, and another boundary condition is adiabatic surface.

4. The numerical simulation method of pulsed laser paint removal according to claim 1, wherein the iterative solution is:

$$\{T_{n+1}\} = \{T_n\} + (1-\theta)\Delta t\{\dot{T}_n\} + \theta \Delta t\{\dot{T}_{n+1}\} \quad (4)$$

wherein, $\{T_n\}$ is a temperature vector at a current time, $\{T_{n+1}\}$ is a temperature vector at a next time, $\theta$ is an Euler parameter, $\Delta t$ is a time step, and $\{\dot{T}_n\}$ and $\{\dot{T}_{n+1}\}$ are change rates of the temperature vectors at the current and next times, respectively; and according to Eq. (4), a temperature change curve of the material of the paint layer at different depths in a heat conduction process is derived.

5. The numerical simulation method of pulsed laser paint removal according to claim 4, wherein according to the temperature change curve of the material of the paint layer at different depths in the heat conduction process, a time for heat transferred to the paint layer to reach a vaporization temperature at a maximum depth is determined as a time to perform an element birth/death operation.

6. The numerical simulation method of pulsed laser paint removal according to claim 1, wherein the coordinate system is moved by programming with APDL language to control the loading position; a movement path of the origin of the coordinate system is taken as a movement path for loading the pulsed laser; and steps 3 to 7 are repeated for each movement, until an entire laser paint removal process is completed, to obtain simulated morphology after the removal of the paint layer by the pulsed laser loaded on a specific path.

7. A use of the numerical simulation method of pulsed laser paint removal according to claim 6, wherein the use is designed to determine a parameter, a processing trajectory and a scanning rate of a pulsed laser to remove a paint layer, according to surface morphology simulated by loading pulsed lasers with different parameters on different paths at different scanning rates.

8. The use of the numerical simulation method of pulsed laser paint removal according to claim 7, wherein according to a zone of a single-pulsed laser-ablated pit in which a paint layer is effectively removed, a selection window of the scanning rate is reduced, and an overlap rate of adjacent ablated pits is controlled to be 0-50%.

9. The use of the numerical simulation method of pulsed laser paint removal according to claim 7, wherein single-direction scanning is conducted track by track on a movement path for loading the pulsed laser, and adjacent scanning tracks are arranged alternately.

10. The use of the numerical simulation method of pulsed laser paint removal according to claim 7, wherein a scanning interval between adjacent scanning tracks is determined based on a zone where the paint layer is effectively removed according to the simulated morphology obtained by single-track laser irradiation on a surface of the paint layer, and an overlap rate of adjacent ablated trenches is controlled to be 0-50%.

\* \* \* \* \*